United States Patent
Carpenter et al.

(10) Patent No.: US 6,396,996 B1
(45) Date of Patent: May 28, 2002

(54) FIXTURE FOR USE IN POLISHING FIBER OPTIC CONNECTORS

(75) Inventors: Tami Michele Carpenter, Bloomington; Paul Alphonse Suek, Eden Prairie; Calvin Theodore Millmann, Richfield; Bruce David Barker, Ramsey, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/400,334

(22) Filed: Sep. 21, 1999

(51) Int. Cl.7 .................................................. G02B 6/00
(52) U.S. Cl. ........................ 385/137; 385/147; 451/41; 451/259
(58) Field of Search .......................... 385/85, 147, 137; 451/278, 41, 365, 259, 287

(56) References Cited

U.S. PATENT DOCUMENTS

| | | |
|---|---|---|
| 2,577,312 A | 12/1951 | Donahue |
| 3,868,794 A | 3/1975 | Zitkus |
| 4,291,502 A | 9/1981 | Grimsby et al. |
| 4,498,260 A | 2/1985 | Doty |
| 4,693,035 A | 9/1987 | Doyle |
| 4,709,512 A | 12/1987 | Okubo et al. |

(List continued on next page.)

FOREIGN PATENT DOCUMENTS

| | | |
|---|---|---|
| DE | 40 04 665 A1 | 8/1991 |
| EP | 0 579 056 A1 | 1/1994 |
| EP | 0 621 107 A1 | 10/1994 |
| JP | 59-161256 | 9/1984 |
| JP | 60-217055 | 10/1985 |
| JP | 61-113005 | 5/1986 |
| JP | 63-283854 | 11/1988 |
| JP | 63-316811 | 12/1988 |
| JP | 5-19140 | 1/1993 |
| JP | 5-157941 | 6/1993 |
| JP | 5-164942 | 6/1993 |
| JP | 6-138343 | 5/1994 |
| SU | 738825 | 6/1980 |

OTHER PUBLICATIONS

Amos, A. G., "Flexing Lathe Fixture Grips Tapered Washers", *American Machinist*, p. 166 (May 9, 1955).

Primary Examiner—Thong Nguyen
Assistant Examiner—Euncha Cherry
(74) Attorney, Agent, or Firm—Merchant & Gould P.C.

(57) ABSTRACT

The present disclosure relates to a fixture for holding a plurality of fiber optic connectors. The fixture includes a holding plate defining a plurality of ferrule receiving openings spaced about a reference axis. The holding plate includes a plurality of movable portions with each of the moveable portions at least partially defining one of the ferrule receiving openings. The moveable portions are moveable between open positions in which the ferrules can be inserted in the ferrule receiving openings, and clamped positions in which the ferrules can be clamped within the ferrule receiving openings. The fixture also includes a drive member mounted to allow relative rotation between the drive member and the holding plate, and a plurality of retaining members spaced about the reference axis. The retaining members are positioned between the drive member and the movable portions of the holding plate. The retaining members are movable relative to the holding plate and the drive member between first positions in which the movable portions of the holding plate are oriented in the open positions, and second positions in which the retaining members retain the movable portions of the holding plate in the clamped positions. By generating relative rotation between the drive member and the holding plate, the retaining members are moved between the first and second positions.

28 Claims, 7 Drawing Sheets

U.S. PATENT DOCUMENTS

| | | |
|---|---|---|
| 4,802,680 A | 2/1989 | Fuchs |
| 4,819,386 A | 4/1989 | Struyf |
| 4,831,784 A | 5/1989 | Takahashi |
| 4,905,415 A | 3/1990 | Moulin |
| 5,107,627 A | 4/1992 | Mock, Jr. et al. |
| 5,281,884 A | 1/1994 | Basavanhally et al. |
| 5,321,917 A | 6/1994 | Franklin et al. |
| 5,345,323 A | 9/1994 | Basavanhally et al. |
| 5,349,784 A | 9/1994 | Grois et al. |
| 5,447,464 A | 9/1995 | Franklin et al. |
| 5,643,064 A | 7/1997 | Grinderslev et al. |
| 5,674,114 A | 10/1997 | Miller et al. |
| 5,711,701 A | 1/1998 | Grinderslev et al. |
| 5,720,653 A | 2/1998 | Miller et al. |

FIXTURE FOR USE IN POLISHING FIBER OPTIC CONNECTORS

FIELD OF THE INVENTION

The present invention relates generally to the field of polishing fixtures for holding fiber optic cables during the polishing process.

BACKGROUND OF THE INVENTION

Figure 1:
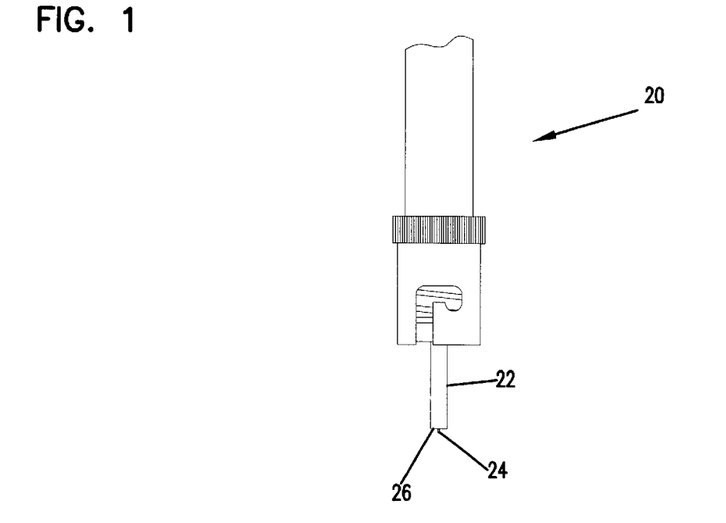
FIG. 1 is a side view of an exemplary fiber optic connector.

FIG. 1 illustrates an exemplary fiber optic connector 20. The connector 20 includes a generally cylindrical ferrule 22 made of a material such as ceramic. An optical fiber 24 extends through the ferrule 22. The fiber 24 is exposed at an end 26 of the ferrule 22.

To enhance signal quality, it is desirable to polish the end 26 of the ferrule 22. During the polishing process, the ferrule 22 is commonly held in a fixture, and the end 26 is pressed against a rotating polishing wheel or disk. Frequently, the end 26 is polished to form a polished surface oriented along a plane that is perpendicular with respect to the longitudinal axis of the fiber 24. However, for some applications, the end 26 is polished to form a surface aligned at an oblique angle with respect to the longitudinal axis of the fiber 24.

SUMMARY OF THE INVENTION

One aspect of the present invention relates to a fixture for holding a plurality of fiber optic connectors. The fixture includes a holding plate defining a plurality of ferrule receiving openings spaced about a reference axis. The holding plate includes a plurality of movable portions with each of the moveable portions at least partially defining one of the ferrule receiving openings. The moveable portions are moveable between open positions in which the ferrules can be inserted in the ferrule receiving openings, and clamped positions in which the ferrules can be clamped within the ferrule receiving openings. The fixture also includes a drive member mounted to allow relative rotation between the drive member and the holding plate, and a plurality of retaining members spaced about the reference axis. The retaining members are positioned between the drive member and the movable portions of the holding plate. The retaining members are movable relative to the holding plate and the drive member between first positions in which the movable portions of the holding plate are oriented in the open positions, and second positions in which the retaining members retain the movable portions of the holding plate in the clamped positions. By generating relative rotation between the drive member and the holding plate, the retaining members are moved between the first and second positions.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying, which are incorporated in and constitute a part of this specification, illustrates several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 2:
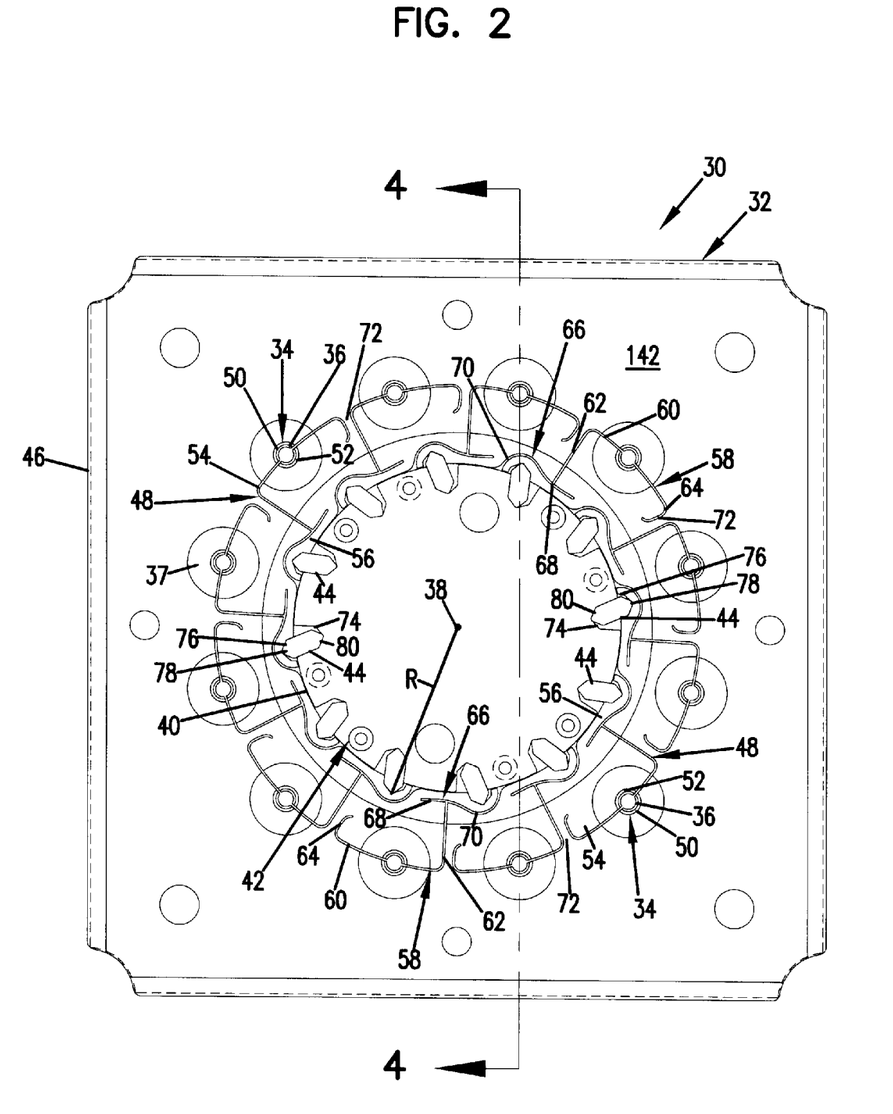
FIG. 2 is a top plan view of a fixture constructed in accordance with the principles of the present invention, the fixture is shown with nests of the fixture in an open orientation.
Figure 3:
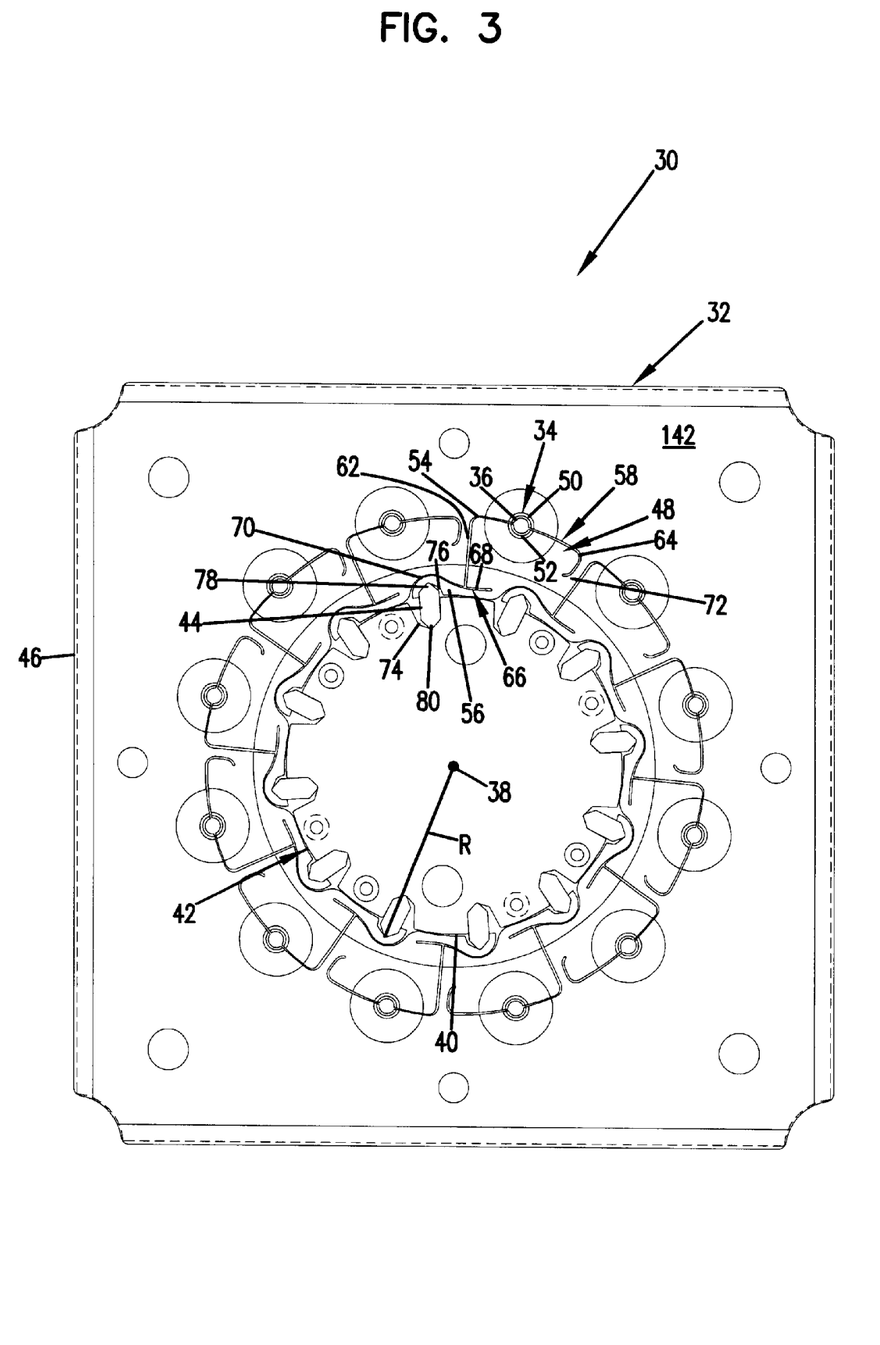
FIG. 3 is a top plan view of the fixture of FIG. 2 with the nests in a closed or clamped orientation.
Figure 4:
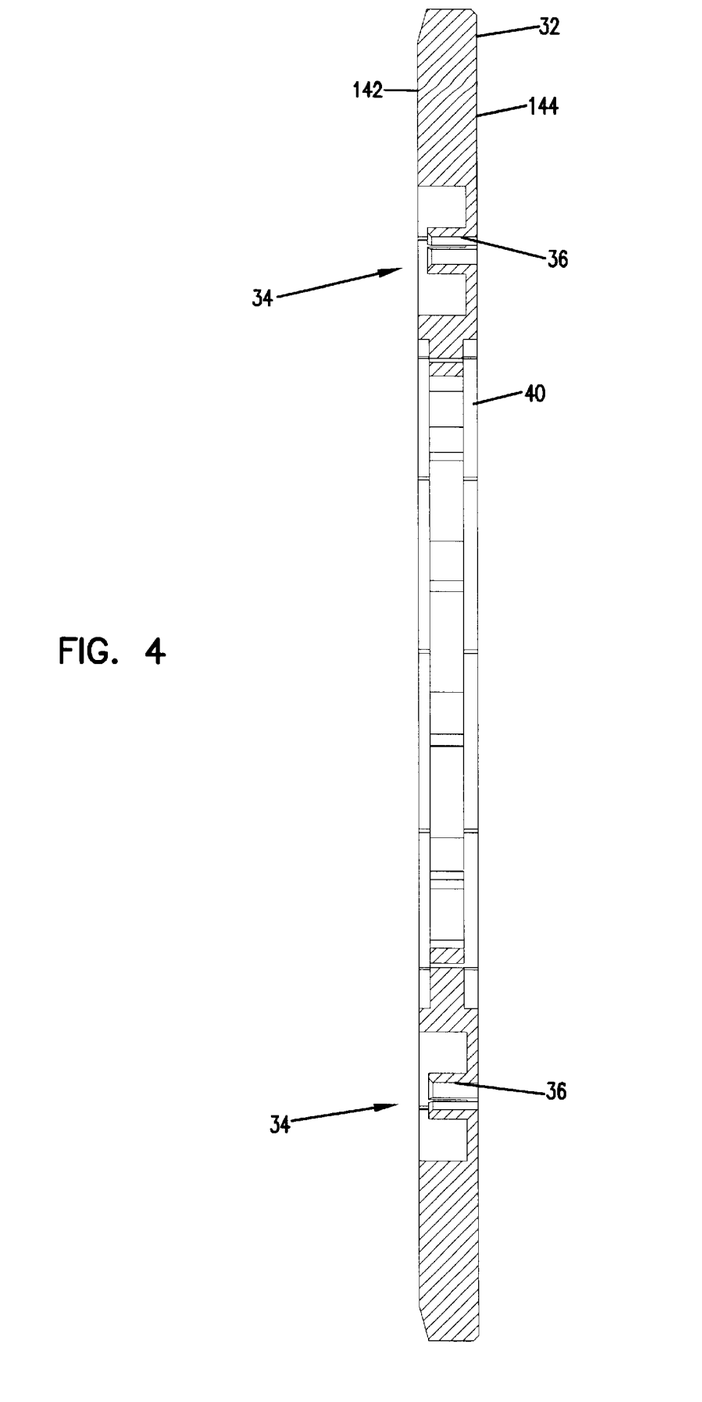
FIG. 4 is a cross-sectional view taken along section line 4—4 of FIG. 2 with the internal components of the fixture omitted for clarity.

FIGS. 2 and 3 show a fixture 30 constructed in accordance with the principles of the present invention. The fixture 30 includes a holding plate 32 having a plurality of nests 34. Each nest 34 defines an opening 36 sized for receiving a ferrule of a fiber optic connector (e.g., the ferrule 22 of the connector 20 of FIG. 1). The openings 36 extend completely through the plate 32 between upper and lower surfaces/sides 142 and 144 (shown in FIG. 4) of the holding plate 32. A reference axis 38 is positioned at the center of the holding plate 32, and the nests 34 are circumferentially spaced about the reference axis 38 (i.e., the nests 34 are arranged in a circular array). The holding plate 32 defines a central opening 40 in which a rotatable drive member 42 is mounted. A plurality of retaining members 44 are positioned between the drive member 42 and the holding plate 32. When the drive member 42 is oriented in a first rotational position (shown in FIG. 2), the nests 34 are oriented in open positions in which ferrules can be manually inserted into or removed from the openings 36. By contrast, when the drive member 42 is oriented in a second rotational position (shown in FIG. 3), the nests 34 are oriented in clamped positions such that the openings 36 are sized for the ferrules to be securely clamped within the nests 34. As shown in FIGS. 2 and 3, the second rotational position of the drive member 42 is rotated several degrees clockwise (e.g., about 5 degrees) relative to the first rotational position of the drive member 42.

Referring again to FIG. 2, the holding plate 32 includes a fixed outer portion 46, and a plurality of inner portions 48. Outer half-portions 50 of the nests 34 are formed by the fixed outer portion 46 of the holding plate 32, while inner half-portions 52 of the nests 34 are formed by the inner portions 48 of the holding plate 32. The inner portions 48 are movable relative to the outer portion 46. For example, each of the inner portions 48 is moveable between an at rest position (shown in FIG. 2) and a radially outwardly displaced position (shown in FIG. 3). The at rest positions correspond to the open positions of the nests 34, and the radially outwardly displaced positions correspond to the clamped positions of the nests 34. To enhance gripping when the nests 34 are in the clamped positions, the nests 34 can each include one or more bumps, projections, or irregularities (not shown) that extend radially into the openings 36. Also, to accommodate various connector configurations, depressions 37 are provided about the nests 34 in the upper side 142 of the holding plate 32. The depressions 37 are sized to receive portions of certain styles of connector housings (e.g., SC type connectors).

Each of the inner portions 48 of the holding plate 32 includes a main body 54 and an extension 56. Each main body 54 is defined by a main body slot 58. The main body slots 58 include arc portions 60 that bisect the nests 34. Preferably, each of the arc portions 60 extends along an arc centered about the reference axis 38. Each of the main body slots 58 also includes an elongated radial portion 62, and a shortened radial portion 64. The radial portions 62 and 64 are located at opposite ends of the arc portions 60. Preferably, the radial portions 62 and 64 extend from the arc portions 60 radially toward the reference axis 38.

The extensions 56 of the inner portions 48 preferably extend transversely outward from the main bodies 54. The term "transversely" is intended to mean that the extensions 56 extend in a direction generally transverse with respect to a radius projecting outward from the reference axis 38. As shown in FIG. 2, each of the extensions 56 extends outward in a counterclockwise direction from its corresponding main body 54. As so configured, the extension 56 of a particular one of the main bodies 54 extends from the particular main body 54 to a region located between the drive member 42 and the main body 54 of a neighboring or adjacent inner portion 48.

Each of the extensions 56 is defined by an extension slot 66. The extension slots 66 have transverse portions 68 that cross the elongated radial portions 62 of the main body slots 58, and curved portions 70 that extend from the transverse portions 68 to the central opening 40 of the holding plate 32.

The inner portions 48 are biased toward the at rest positions of FIG. 2 by inherent spring-like characteristics (i.e., elasticity or resiliency) of the material forming the inner portions 48. Preferably, the inner portions 48 are displaced radially inwardly and outwardly in a flexing or pivoting motion. For example, in the illustrated embodiment, the inner portions 48 preferably flex at flex regions 72 located between the inner portions 48 (i.e., between the shortened radial portions 64 and the elongated radial portions 62). When the inner portions 48 are moved toward the radially outwardly displaced positions of FIG. 3, internal spring-loading at the flex regions 72 biases the inner portions 48 toward the at rest positions.

As depicted in the drawings, the central opening 40 of the holding plate 32 is preferably circular, and the drive member 42 is also preferably circular. The drive member 42 is mounted within the circular opening 40 and defines a plurality of radially outwardly opening pockets 74 that face the holding plate 32. The radially outwardly opening pockets 74 oppose radially inwardly opening pockets 76 defined by the extensions 56 of the inner portions 48 of the holding plate 32. Preferably, the radially inwardly opening pockets 76 are located adjacent to the curved portions 70 of the extension slots 66.

The retaining members 44 of the fixture 30 are mounted within the pockets 74 and 76. For example, the retaining members 44 have outer ends 78 received within the inwardly opening pockets 76 and inner ends 80 received within the outwardly opening pockets 74. The retaining members 44 are preferably elongated in a radial direction relative to the reference axis 38. The retaining members 44 and the drive member 42 are preferably held within the central opening 40 of the holding plate 32 by top and bottom cover plates (omitted for clarity). For example, the cover plates can be circular plates that are fastened to the top and bottom sides of the drive member 42 and include peripheral portions that respectively overlap the upper and lower sides 142 and 144 of the holding plate 32.

Figure 5:
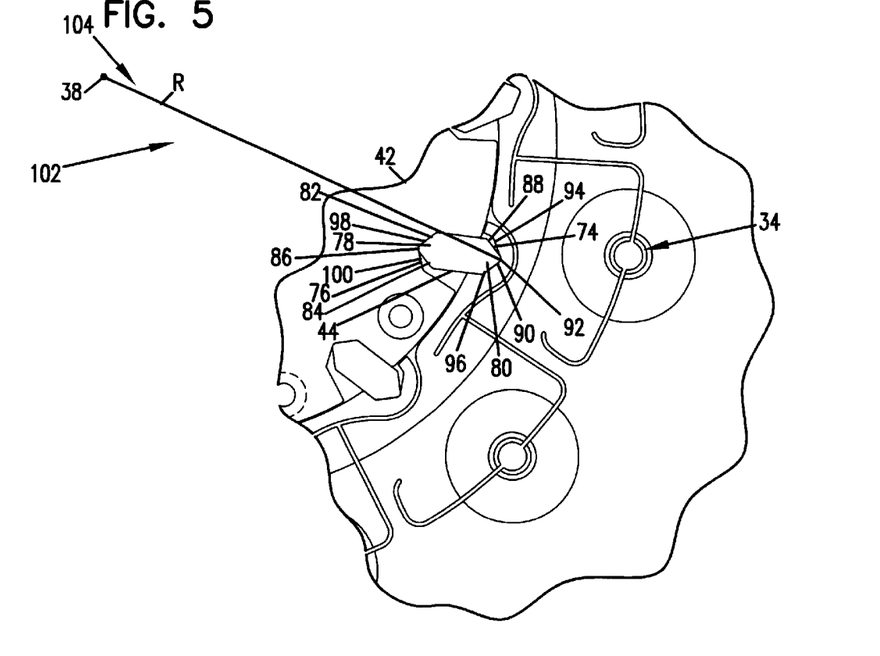
FIG. 5 is a detailed view of one of the nests of the fixture of FIG. 2.
Figure 6:
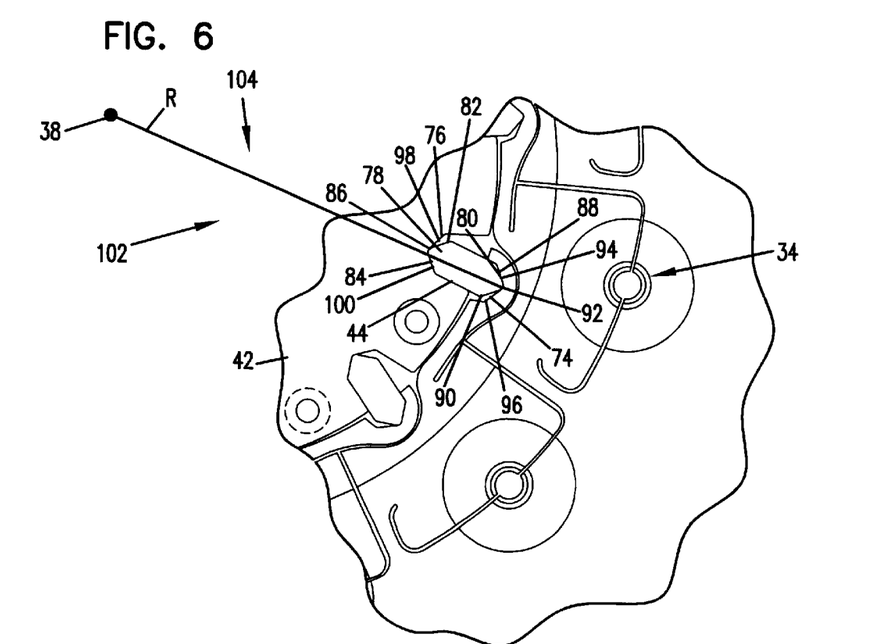
FIG. 6 is a detailed view of one of the nests of the fixture of FIG. 3.

FIGS. 5 and 6 illustrate two of the retaining members 44 in isolation from the other retaining members 44. It will be appreciated that all of the retaining members 44 operate in identical manner. Consequently, the following description of the structure and operation of one of the two retaining members 44 depicted in FIGS. 5 and 6 is representative of all of the retaining members.

As shown in FIGS. 5 and 6, the outer end 78 of the numbered retaining member 44 includes planar surfaces 82 and 84 that intersect at an outer pivot apex 86. Similarly, the inner end 80 of the retaining member 48 includes planar surfaces 88 and 90 that intersect at an inner pivot apex 92. The illustrated outwardly opening pocket 74 includes planar surfaces 94 and 96 that respectively face the planar surfaces 88 and 90 of the inner end 80. Additionally, the illustrated inwardly opening pocket 76 is defined by planar surfaces 98 and 100 that respectively face the planar surfaces 82 and 84 of the outer end 78. The apex 92 of the inner end 80 fit between the surfaces 94 and 96 of the outwardly opening pocket 74, and the apex 86 of the outer end 78 fit between the surfaces 98 and 100 of the inwardly opening pocket 76.

In FIG. 5, the drive member 42 is in the first rotational position (i.e., the rotational position shown in FIG. 2) and the illustrated nest 34 is in the open position. With the drive member in the first rotational position, the retaining member 44 is positioned with surface 90 of the inner end 80 engaging surface 96 of the outwardly opening pocket 76. Also, surface 82 of the outer end 78 engages surface 98 of the inwardly opening pocket 74. As so positioned, the outer end 78 of the retaining member 44 is located on a first side 102 of a reference radius R that extends outward from the reference axis 38. The reference radius R intersects the outer pivot apex 86 of the retaining member 44.

In FIG. 6, the drive member 42 is in the second rotational position (i.e., the rotational position shown in FIG. 3) and the illustrated nest 34 is in the clamped position. With the drive member 42 oriented in the second rotational position, surface 88 of the inner end 80 of the retaining member 44 engages surface 94 of the outwardly opening pocket 74, and surface 84 of the outer end 78 of the retaining member 44 engages surface 100 of the inwardly opening pocket 76. As so positioned, the outer end 78 of the retaining member 44 is located on a second side 104 of the reference radius R.

As is clear from FIGS. 5 and 6, when the drive member 42 is rotated relative to the holding plate 32 from the first rotational position to the second rotational position, the retaining member 44 pivots or toggles from the first side 102 of the reference radius R to the second side 104 of the reference radius R. Similarly, when the drive member 42 is rotated relative to the holding plate 32 from the second rotational position back to the first rotational position, the retaining member 44 pivots or toggles from the second side 104 of the reference radius R back to the first side 102 of the reference radius R.

The outer end 78 of the retaining member 44 is positioned radially farther from the central reference axis 38 when the retaining member 44 is in the position of FIG. 6 (e.g., on the second side 104 of the reference radius R) than when the retaining member 44 is in the position of FIG. 5 (e.g., on the first side 102 of the reference radius R). Consequently, when the drive member 42 is moved from the first rotational position to the second rotational position, the retaining member 44 causes its corresponding extension 56 to be displaced in a radially outward direction. The extension 56 in turn causes its corresponding main body 54 to be displaced radially outwardly such that the nest 34 moves from the open position to the clamped position. With the drive member 42 in the second rotational position, the retaining member 44 retains or holds the inner portion 48 of the holding plate 36 in the radially outwardly displaced position (i.e., the nest 34 is retained in the clamped position).

By contrast, when the drive member 42 is moved from the second rotational position back to the first rotational position, the retaining member 44 radially retracts and internal spring-loading within the flex region 72 of the inner portion 48 causes the inner portion 48 of the plate 32 to return to the at rest position (i.e., the nest 34 moves from the clamped position back to the open position).

The outer end 78 of the retaining member 42 is located farthest from the reference axis 38 when the retaining member 42 is aligned along the reference radius R. Therefore, the extension 56 experiences a maximum deflection when the retaining member 42 is aligned along the radius. Consequently, resilient resistance to movement provided by the extension 56 inhibits the retaining member 42 from being moved unintentionally from the first side 102 to the second side of the reference radius R, or from the second side 104 to the first side 102 of the reference radius R. In other words, to move the retaining member between the two pivot positions, sufficient force should be provided to the drive member 42 to deflect the extension 56 to its maximum deflection point.

Because of the configuration of the retaining members 44, the drive member 42 has a limited range of rotation about the reference axis 38 relative to the holding plate 32. In the illustrated embodiment, the drive member 42 rotates back and fourth between the first rotational position of FIG. 2 and the second rotational position of FIG. 3. For example, the drive member 42 rotates in a clockwise direction when move from the first position (shown in FIG. 2) to the second position (shown in FIG. 3), and rotates in a counterclockwise direction when moved from the second position (shown in FIG. 3) back to the first position (shown in FIG. 2). In moving between the first and second rotational positions, the drive member 42 rotates several degrees relative to the holding plate 32. Preferably, the range of rotational movement is sufficient to toggle the retaining members 46 back and forth across the reference radius R between the pivot positions shown in FIGS. 5 and 6.

By way of non-limiting example, the holding plate 32, the drive member 42 and the retaining members 44 can be made of heat treated steel. Also by way of non-limiting example, the plate 32 can have a thickness of about 0.21 inches, a height of about 4.725 inches and a width of 4.725 inches; the slots 58 and 66 can have a thickness of about 0.014 inches; and the nest openings 36 can have an open position diameter of about 0.099 inches.

Figure 7:
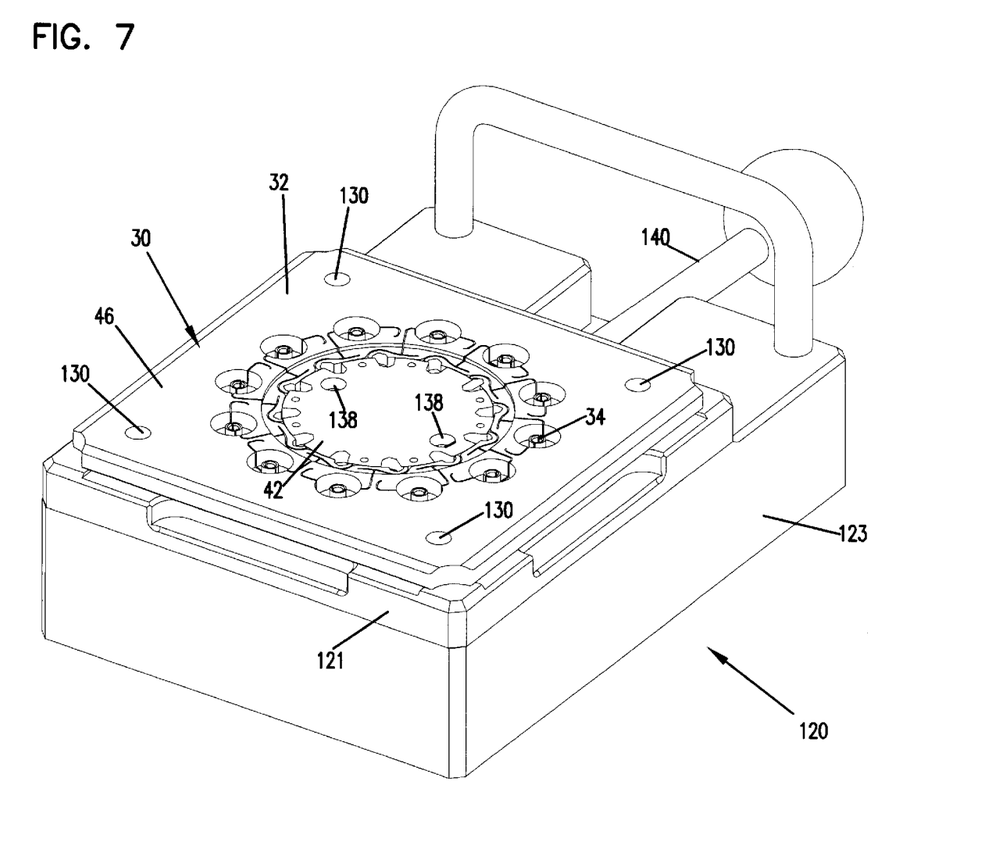
FIG. 7 is a perspective view of the fixture of FIGS. 2 and 3 mounted on a set plate assembly constructed in accordance with the principles of the present invention.
Figure 9:
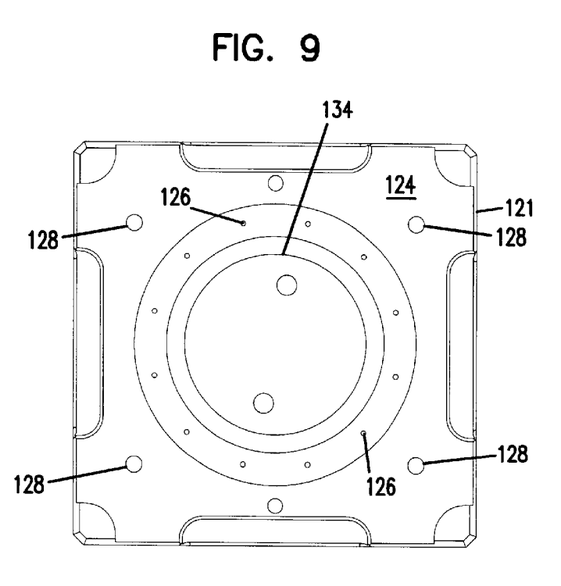
FIG. 9 is a top plan view of a set plate that is part of the set plate assembly of FIG. 7.

FIG. 7 shows the fixture 30 mounted on a set up plate assembly 120 constructed in accordance with the principles of the present invention. The set up plate assembly 120 includes a set up plate 121 positioned on an actuator 123. As shown in FIG. 9, the set up plate 121 includes a top surface 124 that defines a circular array of openings 126. The openings 126 are positioned to align with the nests 34 of the holding plate 32 when the fixture 30 is mounted over the set up plate 121. The openings 126 are preferably smaller that the end faces of the ferrules desired to be polished, but larger than the fibers positioned within the ferrules. The set up plate 121 also includes a plurality of alignment openings 128 that align within corresponding openings 130 defined by the fixed outer portion 46 of the holding plate 32.

Figure 8:
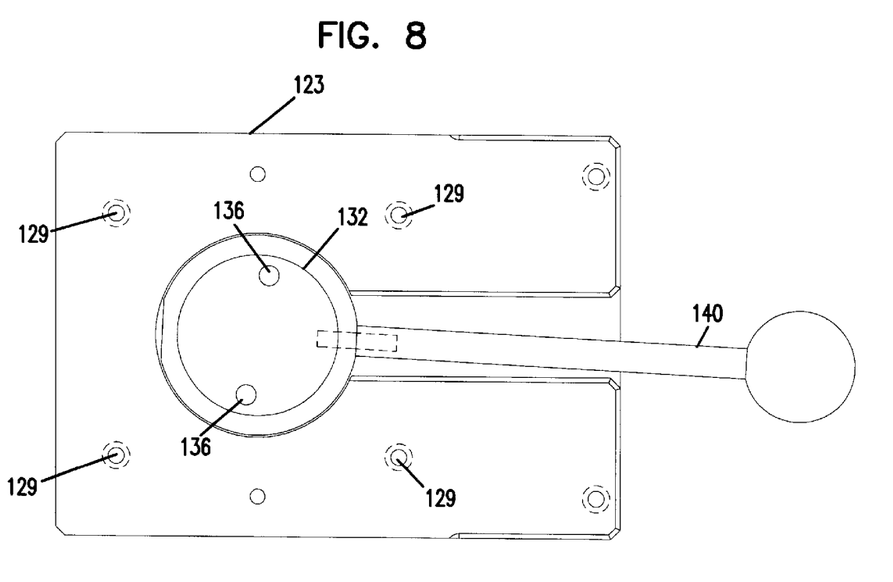
FIG. 8 is a top plan view of an actuator that is part of the set plate assembly of FIG. 7.

As best shown in FIG. 8, the actuator 123 includes a disk-shaped rotational drive 132 that projects upward through a central opening 134 defined by the set up plate 121. The rotational drive 132 includes a plurality of drive pins 136 positioned to be received within corresponding openings 138 of the drive member 42 of the fixture 30 when the fixture 30 is mounted on the set up plate. The actuator 123 also includes registration pins 129 that extend through the openings 128 of the set up plate 121 and the openings 130 of the holding plate 32. A lever arm 140 is mechanically coupled to the rotational drive 132. By pivoting the lever arm 140 back and forth, the rotational drive 132 is respectively rotated in counterclockwise and clockwise directions.

To use the fixture 30, the drive member 42 is positioned in the first rotational position of FIG. 2 such that the nests 34 are open. With the nests in the open positions, ferrules of fiber optic connectors (e.g., such as the ferrule 22 of the connector 20 of FIG. 1) are individually inserted downwardly from the upper side 142 of the holding plate 32 into the openings 36 of the nests 34. The ferrules are preferably pushed downwardly through the openings 36 until end faces of the ferrules protrude beyond the lower side 144 of the holding plate 32. The fixture 30 is then mounted on the set up plate 121 with the fixed alignment pins 128 inserted through the alignment openings 130 of the holding plate 32, and the drive pins 136 inserted through the openings 138 in the drive member 42. As so mounted, the fibers positioned within the ferrules fit within the openings 126 defined by the set up plate 121, and the end faces of the ferrules seat upon the top surface 124 of the set up plate 121. Because the ferrules are loosely held in the nests 34, the holding plate 32 can be moved downward relative to the ferrules that are seated on the top surface 124. This ensures that all of the ferrule end faces are seated on the top surface and, therefore, are aligned along a common plane.

With all the ferrule end faces seated on the top surface 124 of the set up plate, the lever arm 140 of the actuator 123 is pivoted causing the rotational drive 132 to rotate. As the rotational drive 132 rotates, torque from the rotational drive 132 is transferred to the drive member 42 of the fixture 30 through the drive pins 136. The torque from the rotational drive 132 causes the drive member 42 to move from the first rotational position of FIG. 2 to the second rotational position of FIG. 3. This movement of the drive member 42 causes the nests to moved to the clamped positions such that the ferrules are firmly clamped within the nests to inhibit relative movement thereinbetween. The pins 129 prevent the outer portion 46 of the holding plate 32 from rotating along with the drive member 42.

With the ferrules clamped in the fixture 30, the fixture 30 is removed from the set up plate 121 and transferred to a polishing wheel (not shown) where the end faces of the ferrules are polished. After polishing, the drive member 42 is returned to the first rotational position of FIG. 2 and the polished ferrules are removed from the fixture 30. Thereafter, the process can be repeated on a subsequent batch of fiber optic connectors.

Figure 10:
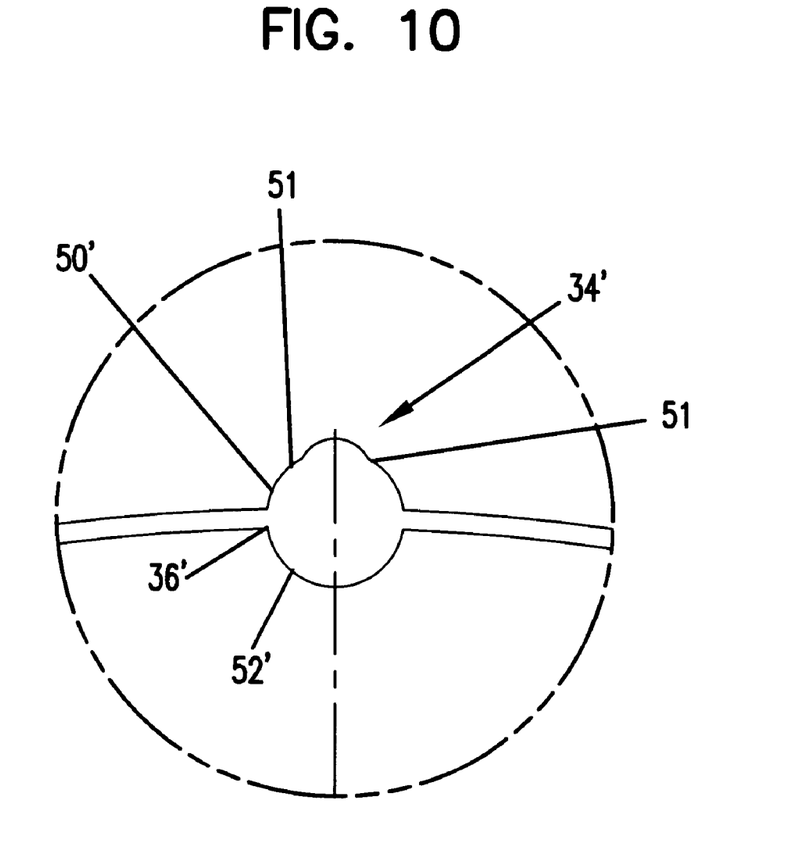
FIG. 10 is a plan view of an alternative nest suitable for use with the fixture of FIGS. 2 and 3.

FIG. 10 illustrates an alternative nest 34' having an outer half-portion 50' and an inner half-portion 52'. The outer half-portion 50' includes two bumps 51 that project into the opening 36' of the nest 34'. The bumps 51 cooperate with the inner half-portion to provide three point clamping of a ferrule. Three point clamping assists maintaining the ferrule in a vertically upright orientation.

Having described preferred aspects and embodiments of the present invention, modifications and equivalents of the disclosed concepts may readily occur to one skilled in the art. For example, while the nests illustrated herein are configured to hold ferrules in a vertically upright orientation, it will be appreciated that the nests could also be oriented so as to each hold a ferrule at an oblique angle relative to a polishing surface. However, it is intended that such modifications and equivalents be included within the scope of the claims that are appended hereto.

What is claimed is:

1. A fixture for holding a plurality of fiber optic connectors including exposed ferrules containing optical fibers, the fixture comprising:
   a holding plate defining a plurality of ferrule receiving openings spaced about a reference axis;
   the holding plate including a plurality of movable portions with each of the moveable portions at least partially defining one of the ferrule receiving openings;
   the moveable portions being moveable generally radially relative to the reference axis between open positions in which the ferrule receiving openings are a first size and clamped positions in which the ferrule receiving openings are a second size that is smaller than the first size;
   a drive member mounted to allow relative rotation between the drive member and the holding plate, the relative rotation being about the reference axis;
   a plurality of radial members spaced about the reference axis, each of the radial members having a length that extends generally in a radial direction relative to the reference axis, and the radial members extending generally radially between the drive member and the movable portions of the holding plate;
   the radial members being pivotally movable between first pivot positions in which the movable portions of the holding plate are oriented in the open positions, and second pivot positions in which the radial members hold the movable portions of the holding plate in the clamped positions; and
   the radial members being moved between the first and second pivot positions by generating relative rotation between the drive member and the holding plate.

2. The fixture of claim 1, wherein each of the radial members includes a pivot point aligned along a radius that projects outward from the reference axis, and wherein the radial members move across their corresponding radiuses when the radial members move between the first and second pivot positions.

3. The fixture of claim 1, wherein the drive member is positioned within an opening defined by the holding plate.

4. The fixture of claim 1, wherein the holding plate and the drive member define pockets for receiving ends of the radial members.

5. The fixture of claim 1, wherein the movable portions include extensions that engage the radial members, the extensions being sized and positioned to each extend from one of the movable members to a region between an adjacent movable member and one of the radial members.

6. The fixture of claim 1, wherein each of the radial members corresponds to one of the movable members.

7. The fixture of claim 1, wherein the plurality of radial members move simultaneously.

8. A fixture for holding a plurality of fiber optic connectors in a fixed alignment for polishing where each of said connectors includes an exposed ferrule containing an optical fiber exposed at an end face of said ferrule, said fixture holding said connectors with said end faces in planar alignment, said fixture comprising:
   a holding plate having an upper surface and an opposite lower surface;
   said plate having a plurality of ferrule receiving openings formed therethrough from said upper surface through said lower surface with each of said openings sized to pass an individual one of said ferrules through said openings with end faces of said ferrules protruding beyond said lower surface;
   said openings circumferentially spaced about an axis to define an opening array;
   each of said openings defined by opposing surfaces of a fixed portion of said plate which is fixed relative to said axis and individual ones of a plurality of movable portions of said plate;
   said fixed portion disposed on a radial outward side of said array relative to said axis and said movable portions disposed on a radial inward side of said array relative to said axis, said movable portions defined by a plurality of slots formed through said holding plate and communicating with a central opening in said holding plate;
   said movable portions movable between a rest position and a radially outwardly displaced position;
   said opposing surfaces of said fixed portion and said movable portions defining said plurality of openings with each of said opening,s sized to:
      freely axially pass an individual one of said ferrules through a respective one of said openings when said movable portions are in said rest position;
      firmly grip said individual one of said ferrules within said respective one of said openings when said movable portions are in said radially outwardly displaced positions with said ferrules restricted from axial movement within said openings;
   said movable portions connected to said fixed portion and biased to said rest position;
   a rotating drive carried on said holding plate and rotatable relative to said fixed portion about said axis between a first position and a second position, the rotating drive positioned within said central opening for rotation about said axis;
   a plurality of retaining members connected between said drive and individual ones of said movable portions, each of said retaining members sized and positioned to move said individual ones of said movable portions from said rest position to said radially outwardly displaced position in response to movement of said drive from said first position to said second position;
   whereby a plurality of ferrules are placed within individual ones of said openings without regard to an amount by which end faces of said ferrules are protruding beyond said lower faces by placing said ferrules through said openings when said movable portions are in said rest position and whereby said end faces can subsequently be moved to planar alignment followed by rotation of said drive to said second position to cause movement of said movable portions to said radially outward position to hold said end faces in said planar alignment.

9. A fixture according to claim 8, wherein said retaining members extend radially outwardly at said second position by a distance greater than a radially outwardly extension of said retaining members at said first position.

10. A fixture according to claim 9, wherein said movable portions each have a separate extension portion attached thereto with an extension portion of a particular movable portion disposed between an adjacent movable portion and a retaining member associated with said adjacent movable portion.

11. A fixture according to claim 8, wherein said movable portions move a distance between said rest position and radially outwardly displaced position sufficient to grip said ferrules without damaging said ferrules.

12. A fixture according to claim 8, wherein said plate includes twelve ferrule receiving openings.

13. A fixture for holding a plurality of fiber optic connectors including exposed ferrules containing optical fibers, the fixture comprising:

a holding plate defining a plurality of ferrule receiving openings spaced about a reference axis;

the holding plate including a plurality of movable portions with each of the moveable portions at least partially defining one of the ferrule receiving openings;

the moveable portions being moveable between open positions in which the ferrule receiving openings are a first size and clamped positions in which the ferrule receiving openings are a second size that is smaller than the first size;

a drive member mounted to allow relative rotation between the holding plate and the drive member, the relative rotation being about the reference axis;

a plurality of retaining members positioned about the reference axis, the retaining members being positioned between the drive member and the movable portions of the holding plate;

the retaining members being movable relative to the holding plate and the drive member between first positions in which the movable portions of the holding plate are oriented in the open positions, and second positions in which the retaining members retain the movable portions of the holding plate in the clamped positions; and the retaining members being simultaneously moved between the first and second positions by generating relative rotation between the drive member and the holding plate about the reference axis.

14. The fixture of claim 13, wherein the retaining members toggle back and forth between the first and second positions.

15. A fixture for holding a plurality of fiber optic connectors including exposed ferrules containing optical fibers, the fixture comprising:

a holding plate defining a plurality of ferrule receiving openings spaced about a reference axis;

the holding plate including a plurality of movable portions with each of the moveable portions at least partially defining one of the ferrule receiving openings;

the moveable portions being moveable generally radially relative to the reference axis between open positions in which the ferrule receiving openings are a first size and clamped positions in which the ferrule receiving openings are a second size that is smaller than the first size;

a drive member mounted to allow relative rotation between the drive member and the holding plate, the relative rotation being about the reference axis;

a plurality of radial members spaced about the reference axis, each of the radial members having a length that extends generally in a radial direction relative to the reference axis, and the radial members extending generally radially between the drive member and the movable portions of the holding plate;

the radial members being pivotally movable between first pivot positions in which the movable portions of the holding plate are oriented in the open positions, and second pivot positions in which the radial members hold the movable portions of the holding plate in the clamped positions;

the radial members being moved between the first and second pivot positions by generating relative rotation between the drive member and the holding plate; and the drive member being positioned within an opening defined by the holding plate.

16. A fixture for holding a plurality of fiber optic connectors including exposed ferrules containing optical fibers, the fixture comprising:

a holding plate defining a plurality of ferrule receiving openings spaced about a reference axis;

the holding plate including a plurality of movable portions with each of the moveable portions at least partially defining one of the ferrule receiving openings;

the moveable portions being moveable generally radially relative to the reference axis between open positions in which the ferrule receiving openings are a first size and clamped positions in which the ferrule receiving openings arc a second size that is smaller than the first size;

a drive member mounted to allow relative rotation between the drive member and the holding plate, the relative rotation being about the reference axis;

a plurality of radial members spaced about the reference axis, each of the radial members having a length that extends generally in a radial direction relative to the reference axis, and the radial members extending generally radially between the drive member and the movable portions of the holding plate;

the radial members being pivotally movable between first pivot positions in which the movable portions of the holding plate are oriented in the open positions, and second pivot positions in which the radial members hold the movable portions of the holding plate in the clamped positions;

the radial members being moved between the first and second pivot positions by generating relative rotation between the drive member and the holding plate; and the holding plate and the drive member define pockets for receiving ends of the radial members.

17. A clamping assembly for clamping fiber optic connectors having exposed ferrules containing optical fibers, the clamping assembly comprising:

a clamping device defining a plurality of ferrule receiving openings, the clamping device including a plurality of movable portions with each of the moveable portions at least partially defining one of the ferrule openings, the moveable portions being moveable between open positions in which the ferrule recieving openings are a first size and clamped positions in which the ferrule receiving openings are a second size that is smaller than the first size;

a set plate on which the clamping device is removably mounted, the set plate including one or more recess structures for receiving the optical fibers of the fiber optic connectors when the clamping device is mounted on the set plate, the set plate also including an alignment surface against which the ferrules of the fiber optic connectors rest when the clamping device is mounted on the set plate; and an actuator for moving the movable portions of the clamping device between the open and clamped positions, the actuator including at least one moveable actuating element that engages the clamping device when the clamping device is mounted on the set plate, the at least one actuating element extending through an actuator opening defined by the set plate.

18. The clamping assembly of claim 17, wherein a lower portion of the actuator is mounted below the set plate and the at least one actuating element extends upwardly through the actuator opening defined by the set plate.

19. The clamping assembly of claim 18, wherein the lower portion of the actuator includes a handle for use in moving the actuating element.

20. The clamping assembly of claim 18, wherein the ferrule receiving openings are arranged in a circle having a center.

21. The clamping assembly of claim 20, wherein at least one actuating element moves in an arc about the center of the circle to move the movable portions of the clamping device between the open and clamped positions.

22. The clamping assembly of claim 21, wherein the set plate includes structure for preventing at least a portion of the clamping device from rotating during actuation of the clamping device.

23. The clamping assembly of claim 18, wherein the at least one actuating element includes a plurality of pins.

24. The clamping assembly of claim 23, wherein the actuator defines pin openings for receiving the pins.

25. The clamping assembly of claim 17, wherein the actuator simultaneously moves all of the movable members between the open and clamped positions.

26. The clamping assembly of claim 17, wherein the one or more recess structures include a plurality of fiber receiving openings adapted to align with the ferrule receiving openings of the clamping device.

27. A set plate assembly for use with fiber optic connectors having exposed ferrules containing optical fibers, the set plate assembly comprising:

a set plate including a central opening and a plurality of fiber receiving openings positioned about central opening, the fiber receiving openings being sized larger than the optical fibers but smaller than the ferrules, the set plate also including an alignment surface adapted to engage end faces of the ferrules when the optical fibers are inserted within the fiber receiving openings; and an actuator assembly mounted at least partially beneath the set plate, the actuator assembly incluing at least two actuator members that extend upwardly through the central opening of the set plate, the actuator assembly further including a handle for rotating the actuator members about a center of the central opening.

28. A ferrule holding component comprising;

first and second opposing members defining a nest sized for receiving a ferrule, at least one of the opposing members being movable between an open postion where the nest is sized to receive a ferrule and a closed position where the nest is sized to clamp a ferrule, the first and second opposing members including at least two bumps that project into the nest for contacting the ferrule when the ferrule is clamped within the nest.

* * * * *

UNITED STATES PATENT AND TRADEMARK OFFICE
CERTIFICATE OF CORRECTION

PATENT NO. : 6,396,996 B1
DATED : May 28, 2002
INVENTOR(S) : Carpenter et al.

It is certified that error appears in the above-identified patent and that said Letters Patent is hereby corrected as shown below:

Column 7,
Line 53, "radiuses" should read -- radii --

Column 8,
Line 35, "opening,s" should read -- openings --

Column 12,
Line 14, "about central" should read -- about the central --

Signed and Sealed this

Fifteenth Day of July, 2003

JAMES E. ROGAN
*Director of the United States Patent and Trademark Office*